Jan. 11, 1966 W. E. PETERSEN 3,228,726
SEAT BELT HOLDER
Filed July 15, 1963 2 Sheets-Sheet 1

INVENTOR.
WENDELL E. PETERSEN
BY
Ramsey, Kolisch & Hartwell
Attys.

Jan. 11, 1966     W. E. PETERSEN     3,228,726
SEAT BELT HOLDER
Filed July 15, 1963     2 Sheets-Sheet 2
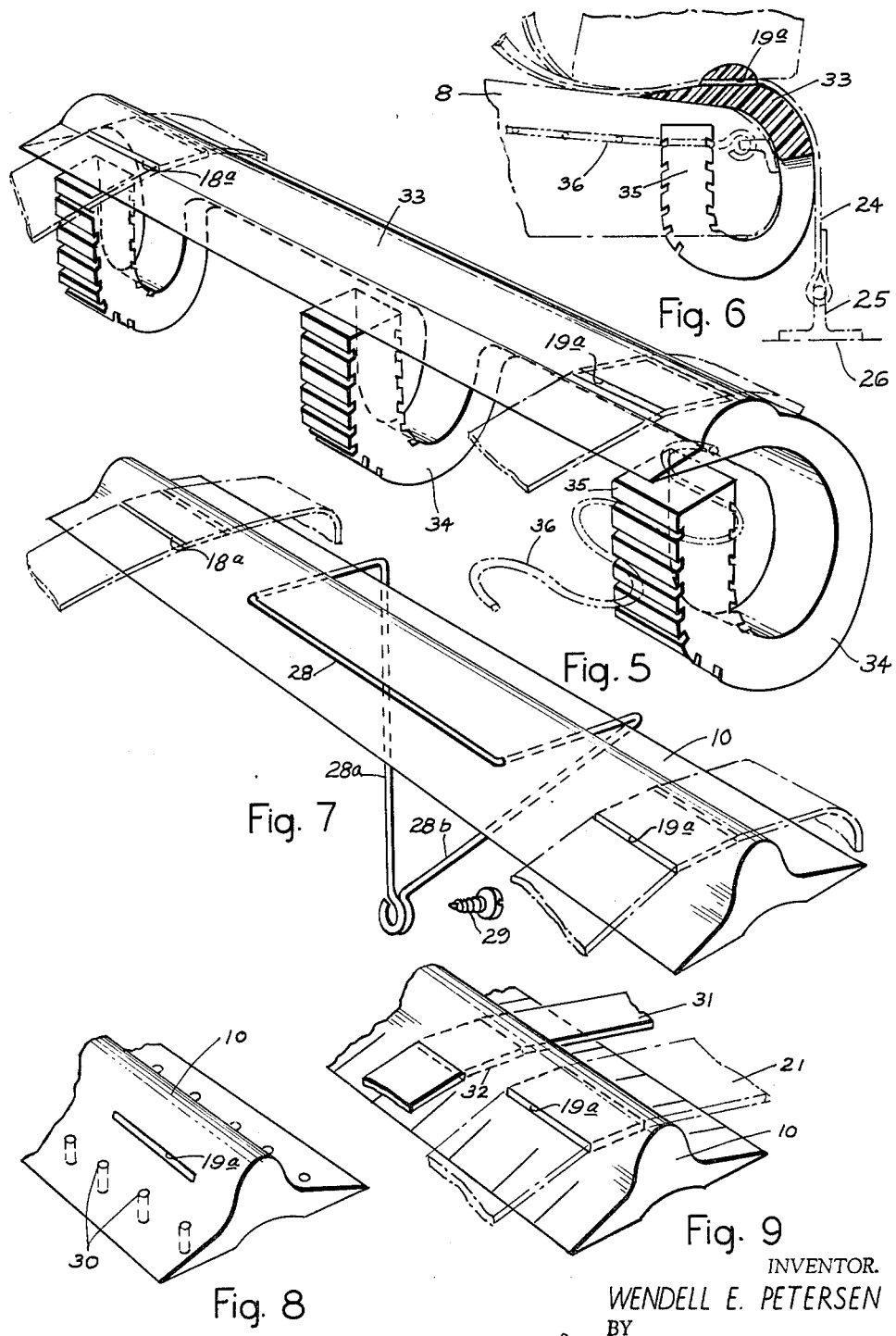
INVENTOR.
WENDELL E. PETERSEN
BY
Ramsey, Kolisch & Hartwell
attys.

United States Patent Office 3,228,726
Patented Jan. 11, 1966

3,228,726
SEAT BELT HOLDER
Wendell E. Petersen, P.O. Box 454, Warrenton, Oreg.
Filed July 15, 1963, Ser. No. 294,953
5 Claims. (Cl. 297—385)

This invention relates to new and useful improvements in the construction of safety devices for passenger vehicles and particularly holders for seat belts of the type which are detachably fastened about the waist of a passenger in a vehicle.

It is recognized that seat belts are a significant safety device for pasengers in various types of vehicles, and automobile passengers are particularly cautioned to wear seat belts at all times while in an automobile. Seat belts of the type which have ends anchored to the floor of the automobile behind the seat for fastening about the waist of a passenger are in common use in automobiles. Many passengers do not follow the advice concerning wearing belts because of the fact that frequently when a passenger enters an automobile the seat belts are not readily accessible for being put into operative condition, i.e., secured about the waist of the passenger. Lack of adequate retaining means for belts between a seat cushion and a back rest enables the free ends of the belts frequently to work their way back off the seat cushion and to become lodged down between the seat cushion and back rest or otherwise to become displaced from the seat cushion, sometimes to get caught in a door. Accordingly, a recognized problem in connection with this type of seat belts has been to maintain them in a readily available position when not in actual use.

Heretofore many attempts at solving this problem have been made. Most of these prior attempts have been along the lines of providing mechanism which will retract the seat belts when not in use so that the two free ends will be held between the seat cushion and back rest. Some of the shortcomings to this type of construction are the complexity and cost or retractable mechanism and the constant possibility of failure to operate of any mechanism depending upon moving parts. In such construction it is necessary to provide means for preventing retraction of the belts too far between the seat cushion and back rest. Also when retractable belts are used by a passenger he does not tighten directly against the fixed anchor in the floor of the car, but against a spring or take-up means interposed between the ends of the belt and provision must be made that in the event of the passenger being thrown forward, the belt will not give. The last-mentioned consideration is an important one, which is difficult to solve with certainty in retractable-type seat belt construction.

Another suggestion which has been made in the prior art with respect to positioning the free ends of seat belts is that a band of elastic material be mounted on the back rest and that the free ends of the seat belts when not in use be held by the elastic band off the seat and against the back rest. When a passenger gets into a vehicle equipped with such a seat belt holder, it is necessary for him to remove the seat belts from the holder (which is inconvenient once inside the vehicle) and when he takes off the seat belts it is necessary for him to replace them in the holder. At best it is difficult to get passengers to wear seat belts and most people will not go to the trouble of taking the seat belts out of a holder and replacing them in the holder. If the holder is not used each time the seat belts are used, the aforementioned problem relating to the use of seat belts is unsolved.

The object of the present invention is to provide a means for effectively positioning the free ends of the seat belts when not in use so that they will be on the seat cushion and readily accessible for fastening about the waist of a passenger without interfering with the seating of the passenger.

Another object of the invention is to provide a permanent holder for positioning the seat belts which requires no action on the part of the seat belt user.

Still another object of the invention is to provide a seat belt holder which has no moving parts and can be readily and inexpensively installed, either as new equipment or added to existing vehicles without requiring any structural changes.

Briefly, the manner in which these objects are accomplished according to the present invention is by frictionally holding the seat belts between the seat cushion and back rest whereby the free ends of the belts are readily available when desired. The means for accomplishing this is a holder for the seat belts which yieldably holds the belts so that desired lengths of the belts will be on the seat cushion and restrained from slipping from the seat cushion.

The invention will now be explained in greater detail with reference to the following detailed description and in conjunction with the accompanying drawings, in which:

FIG. 5 is a perspective view of a modified form of the holder according to the invention;

FIG. 6 is an end elevation, partly in section, of the holder according to FIG. 5, mounted on a seat cushion; and FIGS. 7, 8 and 9 are perspective views of different means for fastening the holder of FIGS. 1–4 to the seat cushion of a vehicle.

Figure 1:
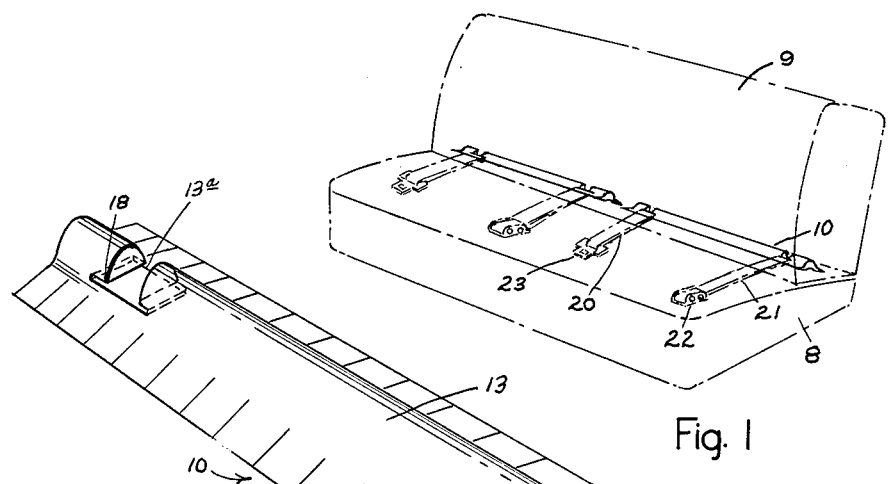
FIG. 1 is a perspective view of the invention mounted with seat belts on the seat cushion of a vehicle.

Referring now to the drawings, and particularly FIGS. 1–4, there is shown in dash dotted lines the usual double seat for a vehicle, such as an automobile, comprising a seat cushion 8 and a back rest 9 which may be stationary or pivotally mounted as in a two-door automobile with a rear seat. The holder which is the subject of the present invention is indicated at 10 and comprises an elongated piece of rubber-like material. By rubber-like material is meant any elastic material, such as natural or synthetic rubber, which has structural stability for the purposes hereinafter described, while at the same time yieldable under hand pressure. The length of the member, as shown in FIG. 1, normally corresponds with that of one-half the width of the vehicle. The holder, however, may be made shorter or longer, depending upon the particular use to which it is put.

Holder 10 comprises a forward tapered section 11 and a backward tapered section 12. Between sections 11 and 12, a central upstanding rib portion 13 is provided. Bottom 14 of the holder is substantially flat except for a slightly curved area 15 beneath rib portion 13. A plurality of slits 16 may be provided in the forward and back sections of the holder to assist in achieving conformation between holder 10 and seat 8.

The manner in which seat belts are held in the holder is by means of a pair of slots 18, 19 that extend through central rib portion 13 and are substantially parallel to bottom 14 of the holder. The slots are spaced apart a distance so that when the holder is in operative position the slots will be in alignment with a pair of seat belts 20, 21. Belts 20, 21 are the conventional web type with a buckle 22 mounted on the free end of belt 21 and a cap 23 mounted on the free end of belt 20. End 24 of each belt is fastened by anchoring means 25 to floor 26 of the vehicle.

The dimensions of slots 18, 19 will depend upon the width and thickness of the seat belt material, but are such that seat belts 20, 21 may be threaded therethrough. In order to facilitate insertion of the belts in the slots, portions 13a, 13b of rib 13 may be cut away. The sides of the slots frictionally engage the seat belts to prevent any unwanted slippage between the two parts, but the frictional engagement is such that it will yield to hand pressure when it is desired to pull the seat belts through the holder. In this connection it is to be noted that when the seat belts are fastened about the waist of a passenger, the belts are tightened against their anchors.

It is to be understood that the holder according to the invention may take shapes and configuration other than that described above, as long as it can be positioned between the seat cushion and bottom of the back rest and yieldably hold the seat belts.

Holder 10 is positioned at the rear of seat cushion 8 and under the bottom of back rest 9 and on top of the seat cushion simply by pushing it in between the seat cushion and back rest. The holder may be held in place by the inherent tightness along the line of adjacency of the two parts. In order, however, to insure proper positioning of the holder at all times, adhesive may be applied to its bottom 14 to fasten it to the seat cushion.

Alternative means of fastening the holder in place on the seat cushion are shown in FIGS. 7, 8 and 9. In FIG. 7, a bracket 28 engages the rear central portion of holder 10 and legs 28a, 28b of the bracket are fastened to the bottom rear portion of the seat cushion by screw 29. In FIG. 8, holes 30 are provided through holder 10 so that it may be sewn or otherwise fastened to the seat cushion. In FIG. 9, separate fastening belts 31 pass through slots 32 in holder 10 and extend completely around the seat cushion. Opposite ends of belts 31 (not shown) are fastened to each other to fix holder 10 in place.

Figures 2, 3:
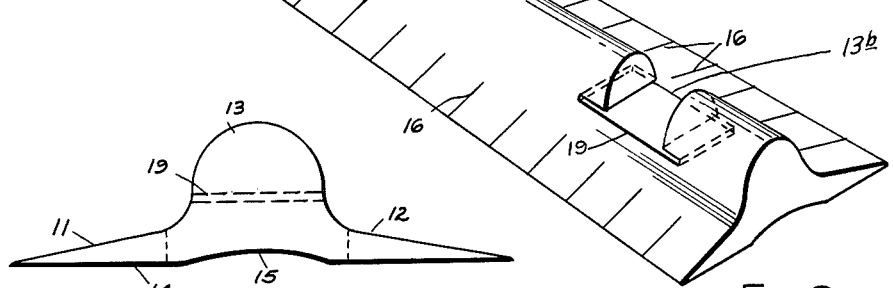
FIG. 2 is a perspective view of the seat belt holder alone.
FIG. 3 is an end elevation of the holder shown in FIG. 2.
Figure 4:
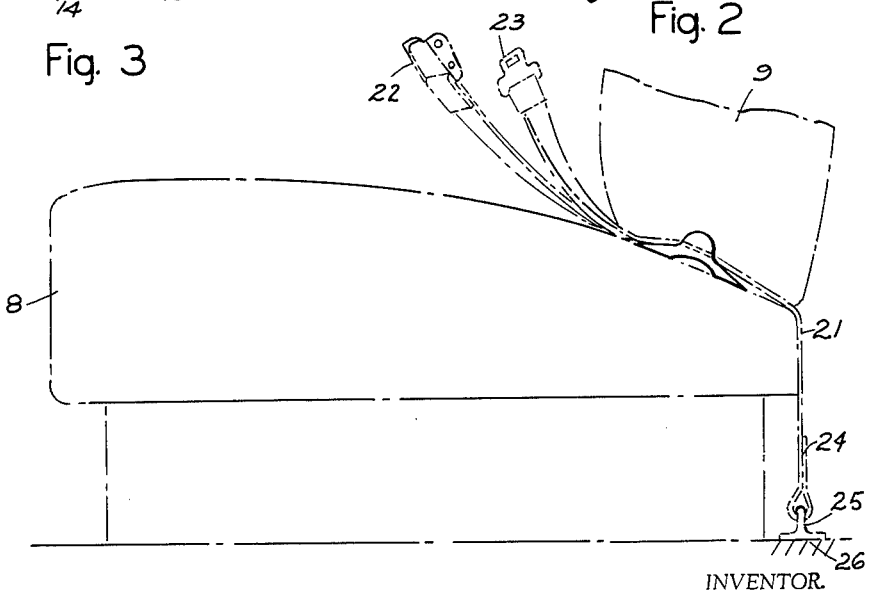
FIG. 4 is an end elevation of a seat cushion with the holder and the free ends of the seat belts in raised position.

In the modifications of FIGS. 5–9, the rib is variously shown with slots 18a, 19a having no portions 13a, 13b cut away for seat belts 20, 21, as in the species of FIG. 2 described above.

In the modification shown in FIGS. 5 and 6, holder 33 is similar to holder 10, previously described, except that at points along the rear edge of the holder, depending U-shaped extensions 34 integral with holder 10 are provided for fastening to seat cushion 8. Extensions 34 have slotted free ends 35 which, as shown in FIG. 6, extend up under seat cushion 8 and fasten to spring 36 in the seat cushion.

While the device has been explained with respect to a specific embodiment of the invention, it will be appreciated by those skilled in the art that various changes may be made in the construction without departing from the scope of the invention as defined in the appended claims.

What is claimed and desired to be secured by Letters Patent is:

1. For use with a passenger vehicle having a seat with a back rest and a seat cushion; the combination comprising a pair of web seat belts each anchored at one end behind the seat, the free ends of the belts extending between the seat cushion and back rest into operative position on the seat cushion, a belt holder comprising an elongated piece of rubber-like material having a substantially flat bottom and a rib along the top, positioned between the bottom of the back rest and the seat cushion, and a pair of spaced-apart slots in the holder in substantial alignment with the belts each adapted to receive a belt and hold it in yieldable frictional engagement.

2. Seat belt retaining means for use in conjunction with a vehicle seat having a back rest and a seat cushion comprising an elongated holder of rubber-like material having a substantially flat bottom and a rib in the top, means for fastening the holder to the rear of the seat cushion between it and the bottom of the back rest, and slots extending through the rib of the holder, each of said slots adapted to receive a belt in yieldable frictional engagement therewith, whereby the seat belts are maintained in a desired position.

3. Seat belt retaining means for use in conjunction with a vehicle seat having a back rest comprising an elongated holder of rubber-like material having a tapered front edge, at least one U-shaped extension integral with the holder and depending therefrom, the free end of the extension being adapted to be fastened to the seat to fix the position of the holder, slots extending through the holder, each of the slots adapted to receive a seat belt in yieldable frictional engagement therewith whereby the seat belts are maintained in a desired position.

4. The device according to claim 3 and in which the free end of said U-shaped extension has a plurality of slots for engagement with portions of the seat to fix the position of the holder.

5. For use in conjunction with a vehicle seat, seat belt holding means comprising an elongated holder of rubber-like material having a substantially flat bottom, and a rib along the top, with plural slots extending through the rib of the holder, spaced along the length of the holder and cut-away portions in the rib overlying the slots.

References Cited by the Examiner

UNITED STATES PATENTS

| | | | |
|---|---|---|---|
| 2,823,045 | 2/1958 | Dye | 297—385 |
| 2,861,627 | 11/1958 | Smith | 297—388 |

FRANK B. SHERRY, *Primary Examiner.*